United States Patent
Seppänen

(10) Patent No.: US 8,191,733 B2
(45) Date of Patent: Jun. 5, 2012

(54) ARRANGEMENT FOR DISPENSING COLOUR PASTE, APPARATUS AND METHOD

(75) Inventor: Tapio Seppänen, Kaasmarkku (FI)

(73) Assignee: CPS Color Equipment Oy, Ulvila (FI)

( * ) Notice: Subject to any disclaimer, the term of this patent is extended or adjusted under 35 U.S.C. 154(b) by 445 days.

(21) Appl. No.: 12/435,590

(22) Filed: May 5, 2009

(65) Prior Publication Data
US 2009/0277925 A1    Nov. 12, 2009

(30) Foreign Application Priority Data

May 6, 2008 (EP) .................................. 08155683

(51) Int. Cl.
B65D 88/54 (2006.01)
B67D 7/64 (2010.01)
B67D 7/62 (2010.01)
B67D 7/58 (2010.01)
F04B 53/12 (2006.01)

(52) U.S. Cl. ............ 222/1; 222/310; 222/318; 222/375; 417/545; 417/549; 417/554

(58) Field of Classification Search ............. 222/1, 282, 222/309, 310, 318, 333, 372, 375, 387; 417/545, 417/547, 549, 552, 554, 555.1
See application file for complete search history.

(56) References Cited

U.S. PATENT DOCUMENTS

| | | | |
|---|---|---|---|
| 4,027,785 A | 6/1977 | Edstrom et al. | |
| 4,358,027 A * | 11/1982 | Poitras | 222/43 |
| 4,494,677 A | 1/1985 | Falcoff | |
| 4,878,601 A * | 11/1989 | Flemming et al. | 222/137 |
| 4,966,308 A * | 10/1990 | Strazdins | 222/43 |
| 5,423,662 A * | 6/1995 | Hetherington | 417/429 |
| 5,445,195 A * | 8/1995 | Kim | 141/104 |
| 5,511,695 A | 4/1996 | Chia et al. | |
| 5,558,251 A * | 9/1996 | Neri | 222/135 |
| 2003/0146244 A1 * | 8/2003 | Sanders | 222/333 |
| 2006/0188380 A1 | 8/2006 | Strong | |

FOREIGN PATENT DOCUMENTS

| | | |
|---|---|---|
| DE | 77 14 072 U1 | 8/1977 |
| GB | 1 475 855 A | 6/1977 |
| JP | 8-74745 A | 3/1996 |
| JP | 2006-15295 A | 1/2006 |

* cited by examiner

Primary Examiner — Darren W Gorman
(74) Attorney, Agent, or Firm — Birch, Stewart, Kolasch & Birch, LLP

(57) ABSTRACT

An arrangement for dispensing color paste, a shading apparatus, a method, a computer program product, and a memory. The arrangement includes a piston pump including a feed channel. The feed channel is provided with a substantially different amount of color paste per travelling length unit when the piston is moving towards the first end of the cylinder than when the piston is moving towards the second end of the cylinder. The arrangement further includes a valve connected to the feed channel, a dispensing channel connected to a first outlet channel of the valve for conveying color paste into a can, and a by-pass feed channel connected to a second outlet channel of the valve for conveying color paste past the can for the paint to be shaded.

10 Claims, 2 Drawing Sheets

ARRANGEMENT FOR DISPENSING COLOUR PASTE, APPARATUS AND METHOD

FIELD OF THE INVENTION

The invention relates to an arrangement for dispensing colour paste.

The invention further relates to a shading apparatus for paint.

The invention further relates to a method of dispensing colour paste.

The invention further relates to a computer program product loadable to a memory of a computer.

The invention further relates to a memory means.

BACKGROUND OF THE INVENTION

Paints are presently sold in such a way that the customer selects the desired colour shade, after which paint of the desired shade is manufactured by adding one or more paint pastes, i.e. colour pastes or colorants, into a paint can containing suitable basic colour.

Paint is manufactured in a shading apparatus typically comprising a plurality of pumps, for instance 16, each of which is arranged to pump a given colour paste. The pumps are often of a piston pump type. Dispensing takes place essentially in such a way that a piston pump sucks paste to the inside of it from a paste container, to which the piston pump is connected via a three-pass valve. After the piston pump has been filled, the piston of the pump is moved in the opposite direction, whereby paste flows back to the paste container. When there remains the paste amount to be dispensed into the paint can in the pump, the channel to the paste container is closed by means of the three-pass valve, and instead, the paste is directed to a channel leading to a paint can.

The size of the cans for the paint to be shaded typically varies between 0.25 l and 20 l, and the amount of paste to be dispensed is 0.05 ml to 2 l/paste. This causes the problem that shading of the paint in bigger cans may take several minutes if the productivity of the pump is low. A solution is to increase the volume of the piston pump by increasing the cylinder diameter. This brings about a new problem: the accuracy of small amounts of paste deteriorates.

BRIEF DESCRIPTION OF THE INVENTION

An object of the present invention is thus to provide an arrangement, an apparatus and a method so as to alleviate the above disadvantages.

The arrangement of the invention is characterized in that the arrangement comprises a piston pump comprising a cylinder; a piston arranged in said cylinder reciprocally movingly; and a piston rod to connect said piston to a power unit, the piston pump further comprising a first back-pressure valve fitted at a first end of the cylinder and arranged to let colour paste into the cylinder; a feed channel fitted to open to a second end of the cylinder; and a second back-pressure valve fitted in the piston and arranged to let colour paste from a cylinder space between the piston and the first end of the cylinder into a cylinder space between the piston and the second end of the cylinder, the cross-sectional area of the piston rod being fitted such that the feed channel is provided with a substantially different amount of colour paste per travelling length unit when the piston is moving towards the first end of the cylinder than when the piston is moving towards the second end of the cylinder; and that the arrangement further comprises a valve connected to the feed channel that is configured to convey colour paste to said valve; a dispensing channel connected to a first outlet channel of the valve for conveying colour paste into a can for the paint to be shaded; a by-pass feed channel connected to a second outlet channel of the valve for conveying colour paste past the can for the paint to be shaded.

The apparatus of the invention is characterized in that it comprises an arrangement as claimed in claim 1.

The method of the invention is characterized by arranging colour paste in a piston pump comprising a cylinder and a reciprocally movable piston fitted therein; and a piston rod for connecting said piston to a power unit, the piston pump further comprising a first back-pressure valve fitted at a first end of the cylinder and arranged to let colour paste into the cylinder; a dispensing channel fitted to open to a second end of the cylinder; and a second back-pressure valve fitted in the piston and arranged to let colour paste from a cylinder space between the piston and the first end of the cylinder into a cylinder space between the piston and the second end of the cylinder, which method further comprises conveying the colour paste pumped by the piston pump to a valve connected to the dispensing channel; providing the dispensing channel with a substantially different amount of colour paste per travelling length unit when the piston is moving towards the first end of the cylinder than when the piston is moving towards the second end of the cylinder; controlling the valve in such a way that colour paste flows into a can for the paint to be shaded or to a by-pass feed channel conveying colour paste past the can for the paint to be shaded.

The computer program product of the invention is characterized in that it comprises program code which, when executed by the processor of a computer, makes the computer control a valve in such a way that colour paste flows into a can for the paint to be shaded or into a by-pass feed channel conveying colour paste past the can for the paint to be shaded.

The memory means of the invention is characterized in that it comprises said computer program product.

An advantage of the invention is that it allows small amounts of paste to be dispensed accurately and, on the other hand, large amounts of paste to be dispensed fast.

BRIEF DESCRIPTION OF THE DRAWINGS

In the following, the invention will be described in greater detail by means of preferred embodiments with reference to the accompanying drawing, in which.

DETAILED DESCRIPTION OF THE INVENTION

Figure 1:
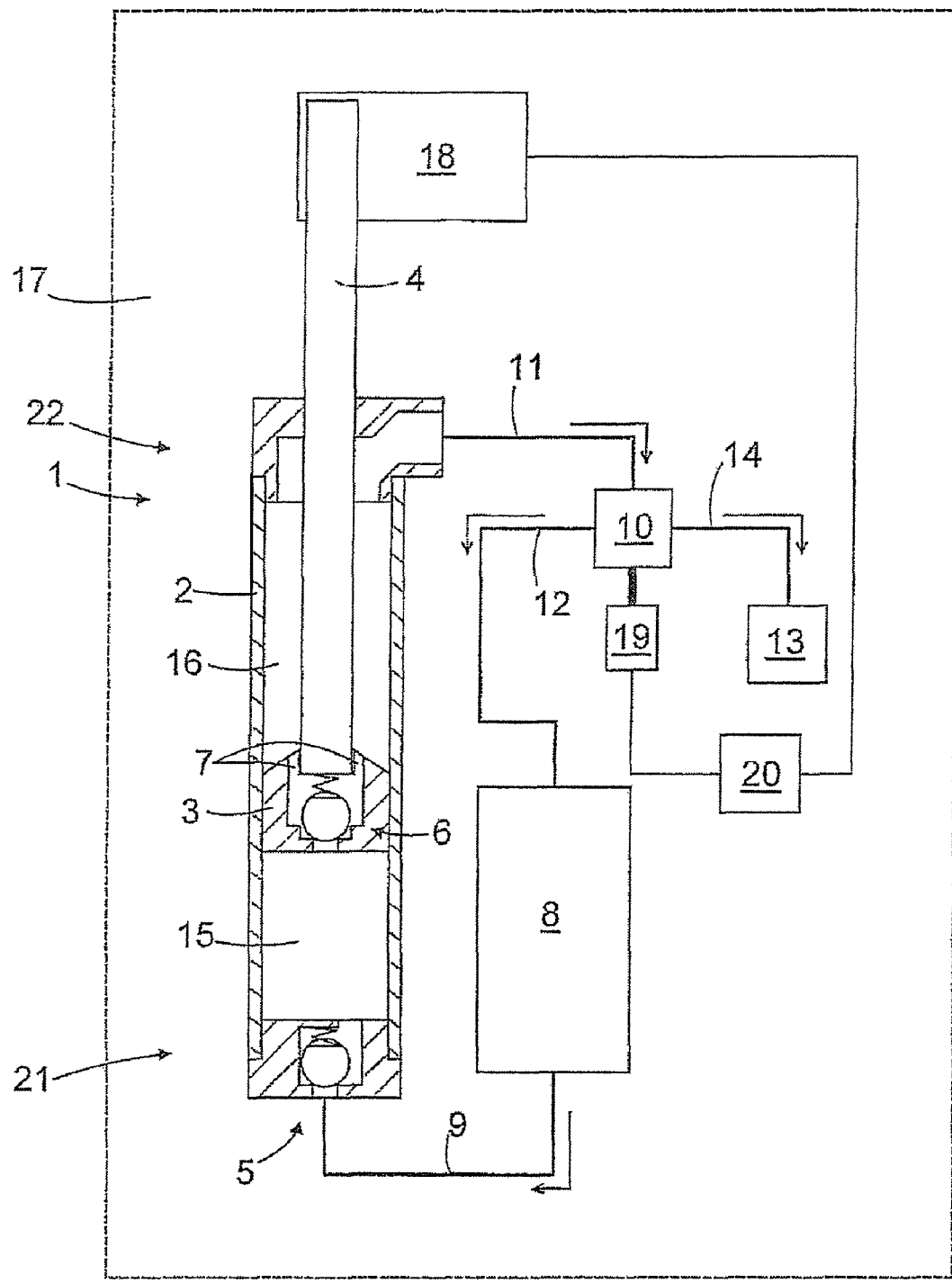
FIG. 1 shows schematically a partial cut-open view of an arrangement according to the invention for dispensing colour paste.

FIG. 1 shows schematically a partial cut-open view of an arrangement according to the invention.

The arrangement comprises a continuous piston pump 1, hereafter referred to as a pump, comprising a cylinder 2 and a piston 3 moving reciprocally therein. The inner diameter of the cylinder 2 determines the cross-sectional area of the cylinder.

The piston 3 is moved via a piston rod 4. The piston rod is connected either directly, as in FIG. 1, or indirectly to a power unit 18 moving the piston 3 in the cylinder. The cross-section perpendicular to the longitudinal direction of the piston rod 4 has a given area that is hereafter referred to as the cross-sectional area of the piston rod.

A first end 21 of the cylinder 2—which is now the lower end of the cylinder 2—comprises a back-pressure valve 5 that allows colour paste, hereafter referred to as paste, to flow into the inside of the cylinder 2 when the piston 3 is moving upwards but prevents the paste from flowing in the opposite direction. The piston 3 has a back-pressure valve 6 of its own, which opens channels 7 going through the piston when the piston 3 is moving towards the first end 21 of the cylinder and, correspondingly, closes said channels 7 when the piston is moving in the opposite direction, i.e. towards a second end 22 of the cylinder 2. It is to be noted in this context that the pump 1 comprises seals known as such, not shown in FIG. 1 for the sake of simplicity.

Figure 2:
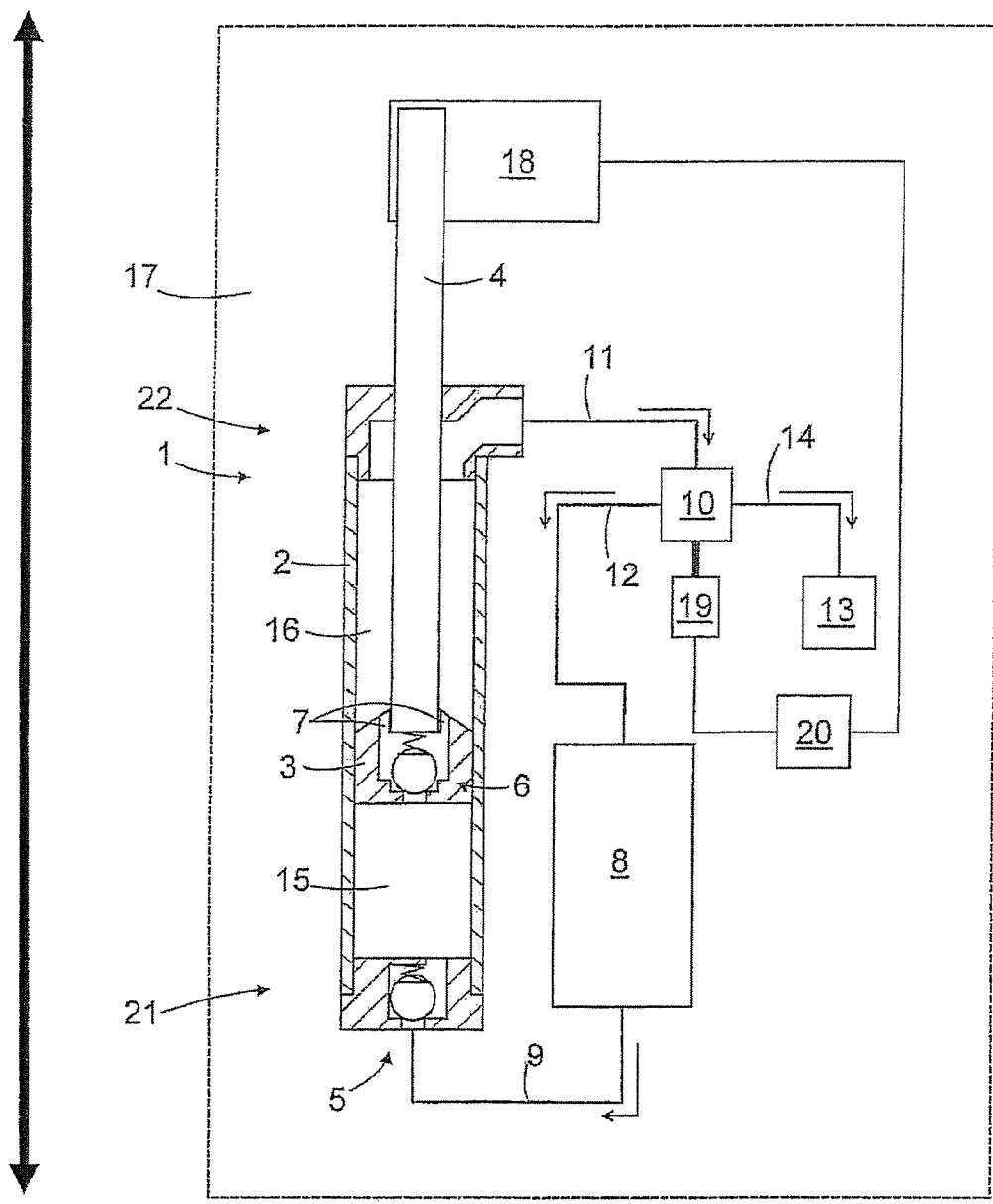
FIG. 2 shows schematically a partial cut-open view of an arrangement according to another embodiment of the invention for dispensing colour paste.

The arrangement is fitted in a shading apparatus 17 in such a way that the cylinder 2 is at least substantially vertical, its first end 21 being lower than the second end 22. The arrangement can be fitted in the shading apparatus in another way as well, for example in such a way that the first end 21 of the cylinder 2 is higher than the second end 22, as shown in FIG. 2. The shading apparatus 17 typically comprises several arrangements according to the invention, each of which dispenses paste of a given colour.

The paste is, in this case, in a paste container 8 connected to the back-pressure valve 5 with a filling channel 9. The paste container is also referred to "canister". When the piston 3 is moving towards the second end 22, paste flows into the cylinder 2 through the back-pressure valve 5. When the piston 3 has reached its extreme position in the cylinder 2, it starts to move towards the first end 21. Thus, the back-pressure valve 6 of the piston 3 opens and paste flows into a space 16 between the piston 3 and the second end. At this time the back-pressure valve 5 of the first end of the cylinder 2 is closed. When the cylinder 2 is filled with paste, the pump 1 operates in a manner presented below.

While the piston 3 is moving towards the second end 22, the pump 1 pumps paste out into a feed channel 11, the amount of paste being $$V_2 = L \times (A-a)$$

where $V_2$ is the volume of the paste when the piston 3 is moving towards the second end 22, L is the travelling length of the piston 3, A is the cross-sectional area of the cylinder 2, and a is the cross-sectional area of the piston rod 4.

The paste moves via the feed channel 11 to a three-pass valve 10, from which it is conveyed either into a return channel 12 and further into a paste container 8, or via a dispensing channel 14 into a can 13 for the paint to be shaded. Instead of the three-pass valve 10, another valve type may also be used which comprises at least one inlet channel and two outlet channels.

When the piston 3 is moving in the direction of the first end 21, i.e. downwards in FIG. 1, the back-pressure valve 6 of the piston 3 is open and the back-pressure valve 5 at the first end 21 of the cylinder 2 is closed. Paste present in a part 15 of the cylinder space between the piston 3 and the first end 21 flows through the channels 7 to the space above the piston 3, i.e. to the part 16 of the cylinder space. In the cylinder space part 16 between the piston 3 and the second end 22, there is not only space filled with paste but also the piston rod 4.

Per each length of movement taking place in the direction of the first end 21 of the piston 3, the amount of paste moving through the piston 3=piston travelling length L×cylinder cross-sectional area A. Correspondingly, space is released between the piston 3 and the second end 22, whereby the volume of this space=travelling length L×(cylinder cross-sectional area A−piston rod cross-sectional area a). Thus, the pump 1 pumps paste out into the dispensing channel 11, the amount of paste being $$V_1 = L \times a$$

where $V_1$ is the volume of the paste when the piston 3 is moving in the direction of the first end 21.

By selecting the cross-sectional area of the piston rod 4 appropriately relative to the cross-sectional area of the cylinder, two power ranges are obtained for the pump 1: the pump 1 is operating in a first power range when the piston 3 is moving in the direction of the first end 21, and in a second power range when the piston 3 is moving in the direction of the second end 22. The ratio of the cross-sectional area of the cylinder space 2 to the cross-sectional area of the piston rod 4 is preferably 1:6 to 1:10. This ratio is, at the same time, the ratio of the amount of paste to be fed into the dispensing channel 11 per travelling length unit of the piston 3.

The shading apparatus 17 illustrated with a rectangle formed by a broken line in FIG. 1 comprises an actuator 19 connected to the three-pass valve 10 and generating power to convey the paste flow going through the valve either into the dispensing channel 14 or into the by-pass feed channel 12. The three-pass valve 10 and the actuator 19 are means known as such, so they are not described in greater detail here.

The actuator 19 is preferably controlled with automatic control means 20 comprising a processor known as such. A computer program code is executed in the processor, the actuator 19 being controlled by means of the computer program code. The computer program product comprises program code which, when executed in the processor of a computer, makes the computer control the valve in such a way that colour paste flows into the can 13 for the paint to be shaded or into the by-pass feed channel 12 conveying colour paste past the can 13 for the paint to be shaded.

The computer program code may be loaded from an internal memory of tine control means. The computer program code may be transferred to the control means 20 from a separate external memory means, such as a CD-ROM or a memory stick. It may also be transferred via a telecommunication network, for example by connecting the control means 20 via a wireless access network to the Internet. The control means 20 also comprise a user interface via which the operator using the shading apparatus can control the functions of the arrangement. The control means 20 also control the use of the power unit 18.

The arrangement and shading apparatus can be used in such a way, for example, that the operator fits a suitable paint can 13 in place in connection with the dispensing channel 14 and feeds the identifier of the paint to be manufactured to the control means 20. On the basis of the identifier, the control means 20 control the three-pass valve and preferably also the power unit 18 in such a way that the right amount of one or more pastes is dispensed into the paint can 13. The procedure may be such that the paste is allowed to flow via the dispensing channel 11 and the return channel 12 back into the paste container 8 until there is the paste amount to be dispensed between the cylinder end 21, 22 and the piston 3 approaching it. At this moment, the three-pass valve 10 is turned to open to the dispensing channel 12, and the right amount of paste flows into the paint can 13. The procedure may also be such that the three-pass valve 10 is open to the dispensing channel 14 once the piston 3 starts to move from its extreme position, and the three-pass valve 10 is turned to open to the return channel 12 when the right amount of paste has been dispensed into the paint can 13.

If the paste amount to be added is very small, it is added into the paint can 13 from the pump 1 containing such paste preferably when the piston 3 of the pump is moving in the direction in which the pump operates in the lower power range. If, by contrast, the paste amount to be added is large, it is added into the paint can 13 from the pump 1 containing such paste preferably when the piston 3 of the pump is moving in the direction in which the pump operates in a higher power range. In this way, small amounts of paste can be dispensed accurately and, on the other hand, large amounts of paste can be dispensed fast.

It will be obvious to a person skilled in the art that as the technology advances, the inventive concept can be implemented in various ways. The invention and its embodiments are not limited to the examples described above but may vary within the scope of the claims.

The invention claimed is:

1. An arrangement for dispensing colour paste, the arrangement comprising a piston pump comprising a cylinder; a piston arranged in said cylinder reciprocally movingly; and a piston rod to connect said piston to a power unit, the piston pump further comprising a first back-pressure valve fitted at a first end of the cylinder and arranged to let colour paste into the cylinder;
   a feed channel fitted to open to a second end of the cylinder; and
   a second back-pressure valve fitted in the piston and arranged to let colour paste from a cylinder space between the piston and the first end of the cylinder into a cylinder space between the piston and the second end of the cylinder, the cross-sectional area of the piston rod being fitted such that the feed channel is provided with a substantially different amount of colour paste per travelling length unit when the piston is moving towards the first end of the cylinder than when the piston is moving towards the second end of the cylinder; and that the arrangement further comprises
   a valve connected to the feed channel, the feed channel being configured to convey colour paste to said valve;
   a dispensing channel connected to a first outlet channel of the valve for conveying colour paste into a can for the paint to be shaded;
   a by-pass feed channel connected to a second outlet channel of the valve for conveying colour paste past the can for the paint to be shaded.

2. The arrangement as claimed in claim 1, wherein the arrangement comprises a paste container, and that the by-pass feed channel is fitted to convey colour paste into the paste container.

3. The arrangement as claimed in claim 1, wherein the ratio of the cross-sectional area of the cylinder to the cross-sectional area of the piston rod is 1:6 to 1:10.

4. A shading apparatus for paint, comprising an arrangement as claimed in claim 1.

5. The shading apparatus as claimed in claim 4, comprising an actuator for changing the state of the valve and for opening the feed channel either to the dispensing channel or to the by-pass feed channel; and automatic control means for controlling said actuator of the valve.

6. The shading apparatus as claimed in claim 4, wherein the cylinder of the piston pump is arranged substantially vertically.

7. The shading apparatus as claimed in claim 6, wherein the second end of the cylinder is higher than the first end.

8. The shading apparatus as claimed in claim 4, wherein the ratio of the cross-sectional area of the cylinder to the cross-sectional area of the piston rod is 1:6 to 1:10.

9. A method of dispensing colour paste, comprising steps of
   arranging colour paste in a piston pump, said piston pump comprising
   a cylinder and a reciprocally movable piston fitted therein; and a piston rod for connecting said piston to a power unit, the piston pump further comprising
   a first back-pressure valve fitted at a first end of the cylinder and arranged to let colour paste into the cylinder;
   a dispensing channel fitted to open to a second end of the cylinder; and
   a second back-pressure valve fitted in the piston and arranged to let colour paste from a cylinder space between the piston and the first end of the cylinder into a cylinder space between the piston and the second end of the cylinder, which method further comprises
   conveying the colour paste pumped by the piston pump to a valve connected to the dispensing channel;
   providing the dispensing channel with a substantially different amount of colour paste per travelling length unit when the piston is moving towards the first end of the cylinder than when the piston is moving towards the second end of the cylinder;
   controlling the valve in such a way that colour paste flows into a can for the paint to be shaded or to a by-pass feed channel conveying colour paste past the can for the paint to be shaded.

10. A shading apparatus as claimed in claim 6, wherein the first end of the cylinder is higher than the second end.

* * * * *